United States Patent Office 3,118,006
Patented Jan. 14, 1964

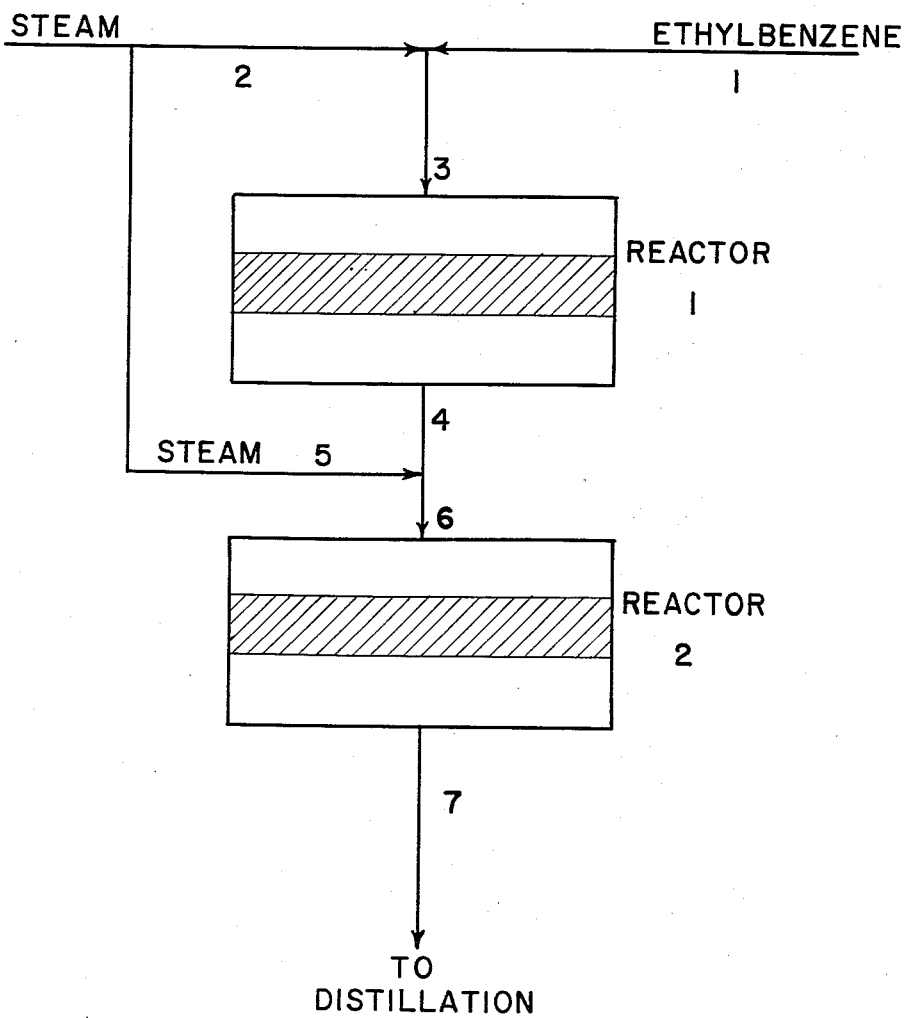

3,118,006
DEHYDROGENATION OF ALKYLATED
AROMATIC HYDROCARBONS
Gordon H. Lovett, Texas City, Tex., and Elbridge M.
Jones, Cincinnati, Ohio, assignors to Monsanto Chemical Company, St. Louis, Mo., a corporation of Delaware
Filed Jan. 5, 1960, Ser. No. 562
7 Claims. (Cl. 260—669)

This invention pertains to an improved method for the dehydrogenation of alkylated aromatic hydrocarbons whereby the conversion of reactant to final product is greatly increased without loss in yield.

The process of manufacturing styrene and related compounds by rapidly passing alkylated aromatic hydrocarbons and steam at high temperatures over a suitable catalyst bed is common knowledge in the trade. For example, in the production of styrene, the usual method is to mix superheated steam and vaporized ethylbenzene in the correct proportions, the resultant temperature being the reaction temperature, and then pass the mixture through a catalytic reactor where dehydrogenation of the ethylbenzene to styrene occurs.

The dehydrogenation of an alkylated aromatic hydrocarbon is a strongly endothermic reaction. Therefore, the amount of the hydrocarbon dehydrogenated is dependent on the amount of heat supplied to the reactor per unit of the alkylated aromatic hydrocarbon. Two types of reactors have been in common use. They are (1) a massive fixed bed of catalyst where heat of reaction is supplied solely by superheated steam added with the hydrocarbon feed and (2) a shell and tube reactor where heat is supplied through the tube walls from flue gases on the outside to maintain a more constant temperature reaction. In the massive fixed bed, which is most universally used, the heat input and therefore conversion of the alkylated hydrocarbon can be increased by increasing the amount or temperature of the superheated steam added with the feed to the reactor. However, this has to be balanced against yield or by-product formation and cost of the steam itself and generally speaking the hotter the mixed stream to the reactor the lower the yield.

Other various schemes have been tried to increase dehydrogenation conversions while maintaining yields. Catalysts have been improved by changing constituents and particle size and reactors have been designed in different shapes and sizes. These advances have allowed conversions of 38% to be obtainable on a plant scale with a reasonable yield.

It is the object of the present invention to provide a new and novel method of increasing dehydrogenation conversions of alkylated aromatic hydrocarbons to vinyl substituted aromatic hydrocarbons. It is a further object of this invention to provide a new method of increasing the dehydrogenation conversion of ethylbenzene to styrene from approximately 38% to approximately 50% and maintain economical yields. These and other objects and advantages of the invention will become apparent from the description of the invention.

In the embodiment of this invention two or more catalytic dehydrogenation reactors or reactor beds operating in series are used whereby the alkylated aromatic hydrocarbon to be dehydrogenated is fed to the first reactor mixed with only a fraction of the usual amount of steam. The effluent from said first reactor is mixed with the remainder of the usual quantity of steam, if only two reactors are used, and the mixture is fed to the second reactor where the alkylated aromatic hydrocarbon is again dehydrogenated and the vinyl substituted aromatic hydrocarbon is subsequently recovered by distillation. This scheme can be repeated for any number of reactors in series. Thus by these means the object of injecting more heat energy into the reaction without increasing the temperature of the alkylated aromatic hydrocarbon and steam mixture is accomplished.

The figure shows a flow diagram embodying the invention herein described. As an example in the production of styrene from ethylbenzene, the following conditions are illustrative of, but not limiting, the invention: 100 pounds per hour of vaporized ethylbenzene at 540° C.(1) is mixed with 100 pounds per hour of superheated steam at 760° C.(2) and the mixture is fed immediately to the first reactor at the reaction temperature of 630° C.(3).

The ethylbenzene is dehydrogenated in the reactor upon contact with a fixed bed of catalyst which has a composition of ferric oxide 86.8%, chromium oxide 1.6%, and potassium, calculated as postassium carbonate, 11.9%, and is in the form of 3/16 in. pellets. The hydrocarbon portion of the effluent withdrawn from the first reactor is at approximately 550° C.(4). One hundred pounds per hour of steam at 760° C.(5) is mixed with this effluent and immediately passed to the second reactor at 620° C.(6). The reactants are withdrawn from the second reactor at 580° C.(7) with approximately 50% of the ethylbenzene now dehydrogenated to styrene. The total stream is then cooled and condensed followed by distillation to separate the styrene which is subsequently purified by further distillation. Yields of styrene from ethylbenzene are better than by the conventional technique of dehydrogenation. Although the example shows more than one vessel, it is obvious that all reactor beds may be in the same vessel.

As an example in the production of styrene from ethylbenzene, the usual method is as follows: One hundred pounds per hour of vaporized ethylbenzene and 20 pounds per hour of steam at 540° C. are mixed with 200 pounds per hour of superheated steam at 700° C. and the resultant mixture is fed immediately into the dehydrogenation reactor at 630° C. The reaction mixture effluent from the reactor contains approximately 38% of the ethylbenzene converted to styrene. This mixture is subsequently separated by distillation and the styrene product recovered.

The particular advantage of this invention is the greatly increased conversion of alkylated aromatic hydrocarbon to vinyl substituted aromatic hydrocarbon which was unexpected in view of numerous double reactor schemes in the prior art which were not significant enough to justify changes or additions in the usual and normal method of dehydrogenating alkylated aromatic hydrocarbons used predominantly in the industry.

The invention may be practiced with a steam temperature range of 650° C. to 800° C. but preferably in the range of 725° to 775° C. The dehydrogenation reaction can be operated in accordance with this invention at a temperature of 550° C. to 700° C. but the preferred area for reaction is 600° to 650° C. for the most economical dehydrogenation of the alkylated aromatic hydrocarbon.

It has been determined that the present method can be operated with as little as a total of 1.5 lbs. of steam and as high as 20 pounds of steam per pound of an alkylated aromatic hydrocarbon. However, for practical reasons such as economy of operation, the preferred range is from 2 to 3 pounds of total steam per pound of alkylated aromatic hydrocarbon.

The steam split between the first reactor inlet and the second reactor inlet can be adjusted from a ratio of 1:3 to a ratio of 3:1 and practice the improvement shown by this invention, but the preferred ratio is from 2:3 to a ratio of 3:2.

Reactor size has no bearing on the operation of the invention but it is presumed that the optimum size to give the proper residence time, as is usual in this type of dehydrogenation reaction, will be used.

Reactor configuration is likewise unimportant. This invention can be practiced in a fixed bed reactor, tubular reactor, or fluidized bed reactor with equal success.

Multiple reactors can be used in this invention depending on the economics of the situation of the range of from 2 to 5 reactors in series. However, for the most desirable range of steam temperature and alkylated aromatic hydrocarbon yields, the preferred number of reactors is 2 or 3.

Any well known dehydrogenation catalyst such as ferric oxide-potassium oxide, magnesium oxide-ferrous oxide-potassium carbonate, alumina-silica-nickel or others may be used in practicing this invention. However, it is presumed that whatever catalyst is determined to be most desirable will be used in both reactors to realize the same selectivity and by-product components.

By similar procedure other alkylated aromatic hydrocarbons such as isopropylbenzene, diethylbenzene, ethylnaphthalene, and ethylchlorobenzene may be dehydrogenated to produce vinyl substituted aromatic hydrocarbons.

What is claimed is:

1. In a process for dehydrogenating an alkylated aromatic hydrocarbon feed in the presence of steam in a plurality of catalytic dehydrogenation reactor beds which are operated in series wherein the effluent from one reactor bed is introduced into the next reactor bed and a portion of the initial quantity of the hydrocarbon is dehydrogenated in each reactor, at a temperature from about 550° C. to about 700° C. the improvement which comprises introducing a portion of the total amount of steam into the hydrocarbon feed inlet of each reactor bed.

2. The process described in claim 1 wherein the number of reactor beds is two and the ratio of steam split between the first and second dehydrogenation reactor bed inlets is 1:3 to 3:1.

3. The process described in claim 1 wherein the number of reactors in series is from 2 to 5.

4. The process described in claim 1 wherein the alkylated aromatic hydrocarbon is ethylbenzene.

5. The process described in claim 2 wherein the alkylated aromatic hydrocarbon is ethylbenzene.

6. The process described in claim 1 wherein the number of reactor beds is two and the steam to be added is in the preferred range of 725° to 775° C., the dehydrogenation reaction begins in the preferred temperature range of 600° to 650° C. and the ratio of steam split between the inlet of the first and second dehydrogenation reactor beds is in the range of 2:3 to 3:2.

7. The process described in claim 1 wherein the number of reactors in series is 2 to 3.

References Cited in the file of this patent

UNITED STATES PATENTS

| | | |
|---|---|---|
| 2,461,331 | Leesemann | Feb. 8, 1949 |
| 2,774,572 | Goins | Dec. 18, 1956 |
| 2,851,502 | Bowman et al. | Sept. 9, 1958 |
| 2,902,522 | Owen | Sept. 1, 1959 |